(12) United States Patent
Luo et al.

(10) Patent No.: US 11,472,547 B2
(45) Date of Patent: Oct. 18, 2022

(54) HIGH-SPEED FLIGHT METHOD AND COLEOPTER

(71) Applicant: Conggui Luo, Beihai (CN)

(72) Inventors: Conggui Luo, Beihai (CN); Xiaoyan Zheng, Beihai (CN)

( * ) Notice: Subject to any disclaimer, the term of this patent is extended or adjusted under 35 U.S.C. 154(b) by 23 days.

(21) Appl. No.: 16/787,027

(22) Filed: Feb. 11, 2020

(65) Prior Publication Data

US 2020/0172239 A1 Jun. 4, 2020

Related U.S. Application Data

(63) Continuation of application No. PCT/CN2018/000297, filed on Aug. 14, 2018.

(30) Foreign Application Priority Data

| Aug. 15, 2017 | (CN) | ......................... 201710704379.8 |
| Nov. 12, 2017 | (CN) | ......................... 201711110752.3 |
| Nov. 30, 2017 | (CN) | ......................... 201711242954.3 |
| Aug. 12, 2018 | (CN) | ......................... 201810912833.3 |

(51) Int. Cl.
*B64C 29/02* (2006.01)
*B64C 39/00* (2006.01)
*B64C 39/06* (2006.01)

(52) U.S. Cl.
CPC ............ *B64C 29/02* (2013.01); *B64C 39/001* (2013.01); *B64C 39/06* (2013.01); *B64C 39/062* (2013.01)

(58) Field of Classification Search
CPC ....... B64C 29/02; B64C 39/001; B64C 39/06; B64C 39/006; B64C 39/062
See application file for complete search history.

(56) References Cited

U.S. PATENT DOCUMENTS

| 4,023,751 A | * | 5/1977 | Richard ................. B64C 39/001 |
| | | | 244/23 C |
| 6,672,539 B1 | * | 1/2004 | Schoeneck .............. B64C 27/20 |
| | | | 244/12.2 |

(Continued)

FOREIGN PATENT DOCUMENTS

| CN | 101643116 A | 2/2010 |
| CN | 102384042 A | 3/2012 |

(Continued)

OTHER PUBLICATIONS

Internation Search Report of PCT/CN2018/000297, dated Oct. 25, 2018.

*Primary Examiner* — Rodney A Bonnette

(57) ABSTRACT

A wing ring flying saucer is disclosed, which is operative to be driven to fly fast without needing an extra engine, and can turn, brake and fly backwards. The method of flying the wing ring flying saucer is as follows: airfoils of the wing ring or flow generators are enabled to repeat the same inclining process while passing by a specific section in circular motions of two times or more than three times in succession, so that a force perpendicular to the axial direction is created from an original resultant force in line with the axial direction of the wing ring (that is, a resultant force created by lift produced by all the airfoils), thereby enabling the wing ring flying saucer to fly, turn and go backwards at a relatively high speed.

10 Claims, 17 Drawing Sheets

(56) References Cited

U.S. PATENT DOCUMENTS

| | | | | |
|---|---|---|---|---|
| 6,705,905 B1* | 3/2004 | Tanaka | ................... | B64C 29/02 |
| | | | | 440/12.51 |
| 10,293,928 B2 | 5/2019 | Vetter et al. | | |
| 10,450,063 B1* | 10/2019 | Randall | ................... | B64C 29/02 |
| 2002/0014554 A1* | 2/2002 | Kirjavainen | ............ | B64C 27/32 |
| | | | | 244/17.11 |
| 2016/0347448 A1* | 12/2016 | Henning, Jr. | ........... | B64C 39/06 |
| 2020/0000017 A1 | 1/2020 | Marler, III et al. | | |

FOREIGN PATENT DOCUMENTS

| | | | |
|---|---|---|---|
| CN | 103195662 A | | 7/2013 |
| CN | 104816825 A | | 8/2015 |
| CN | 104976074 A | | 10/2015 |
| CN | 106986019 A | | 7/2017 |
| WO | 2015116015 A1 | | 8/2015 |

* cited by examiner

HIGH-SPEED FLIGHT METHOD AND COLEOPTER

CROSS-REFERENCE TO RELATED APPLICATIONS

This application is a continuation, of International Patent Application No. PCT/CN2018/000297 with a filing date of Aug. 14, 2018, designating the United States, now pending, and further claims priority to Chinese Patent Application No. 201710704379.8 with a filing date of Aug. 15, 2017, and further claims priority to Chinese Patent Application No. 201711110752.3 with a filing date of Nov. 12, 2017, and further claims priority to Chinese Patent Application No. 201711242954.3 with a filing date of Nov. 30, 2017, and further claims priority to Chinese Patent Application No. 201810912833.3 with a filing date of Aug. 12, 2018. The content of the aforementioned applications, including any intervening amendments thereto, are incorporated herein by reference.

TECHNICAL FIELD

The present invention relates to coleopter technologies, and particularly relates to a disk aircraft technology taking a coleopter as a lift device.

Background and Technical Problem

A coleopter includes an annular rotorcraft, an annular wind turbine, an annular water turbine and an annular propeller machine, while a wing ring flying saucer is a disk aircraft or an underwater vehicle taking the coleopter as a lift device.

A coleopter technology, is comprehensively recorded, in *Wing Ring and Device and Method with Wing Ring* invented by Luo Conggui (having a publication number of CN103195662A). Although the present application relates to deflectors for engines and fins, deflection manners and technical effects recorded by the present application are not completely involved and implied. FIG. 47 and FIG. 48 in drawings of description indicate that, an existing wing ring flying saucer may obtain driving force in a horizontal direction by virtue of an extra engine only, which may seriously compress effective carrying capacity and increase energy consumption and pollution. Can we find a method and device for driving the flying saucer to advance, turn, brake and go backwards without the extra engine?

FIGS. 47-50 in drawings of the description of the application indicate that, a central engine room (FIGS. 47-48) and an outer ring engine room (FIGS. 49-52) cannot be simultaneously arranged in the existing wing ring flying saucer technology, and even communication and connection of the two engine rooms cannot be realized. How can we make the wing ring flying saucer have two kinds of or two engine rooms and realize communication and connection?

A large coleopter has a great diameter. The farther wing panels in fins away from the center of a circle are, the higher the airspeed is, and the higher the lift is; otherwise the closer to the center of the circle the wing panels are, the lower the airspeed is, and the more burdensome the wing panels are. How to make each wing panel to rotate at the same linear velocity?

The large coleopter has the great diameter, linear velocity of a wing ring of the coleopter is extremely high, and centrifugal force borne by an annular truss of the wing ring is very large. How to greatly increase capacity of resisting centrifugal separation on premise of not increasing weight of the annular truss and grades of materials?

TECHNICAL SOLUTIONS

I. Technical Solutions of High-Speed Flight Method of Flying Saucer

The present invention provides a method for providing driving force in a horizontal direction for a disk aircraft or a disk submarine taking a coleopter as a lift device and a horizontal thrust device.

General solution: in any disk aircraft or disk underwater vehicle taking the coleopter as the lift device, fins on the wing ring or fluid generators are enabled to repeat the same deflection action while passing by a specific section in circular motions of two times or more than three times in succession.

The 'fluid generators' refer to devices capable of producing fluid, such as jet engines, propeller engines, powerful fans, steam ejectors, water ejectors and magnetic flow generators.

The 'repeat' refers to not only 'repeat without intervals' but also 'repeat with intervals' (that is, intervals of a complete non-deflection process or not exactly same deflection processes between two deflection processes).

The 'specific section' not only refers to a specific section where the midpoint or/and length is set constant but also refers to a specific section where the midpoint or/and length is set changeable or/and variable ('or/and', that is, 'or' or 'and'). Any section of which the start point and end point do not coincide is called the 'specific section' herein. Although the start point and the end point coincide, the fins or the fluid generators may change the deflection angle in the whole process in one circular motion, and the section belongs to the 'specific section' called herein.

Previously, the reason why the disk aircraft taking the coleopter as a lift mechanism must be additionally provided with an aero-engine capable of specially providing driving force in a horizontal direction is as follows: on any wing ring of the existing coleopter, an angle of attack of each fin, an included angle between wingspan orientation of each fin and an axis of the wing ring, and an included angle between an acting force produced by each fluid generator and a tangent line of the wing ring can only be unified. If the fins deflect, deflection of the same angle can be produced simultaneously only. Therefore, the existing coleopter may only form a resultant force consistent with the axial direction and can only provide lift for the wing ring flying saucer.

In the present invention, the angles of attack of the fins, the wingspan orientations or the fluid directions only deflect on the specific section, so that a force in the horizontal direction is formed from the unified upward lift. The flying saucer is driven to advance, turn, brake or fly backwards just by utilizing the previous force (referring to directly fly backwards in case of not turning round or steering). The wing ring flying saucer has a hovering function, so when the direction of the driving force in the horizontal direction reverses, the flying saucer may safely brake.

Sub-solution 1: the sub-solution is similar to the general solution, and more than one specific section is set.

Sub-solution 2: the sub-solution is similar to the general solution, and in the two times of 'while passing by a specific section in circular motions of two times or more than three times in succession', the fins or the fluid generators only 'repeat the same deflection process' in the respective whole processes, while the two times of the whole processes are not the same deflection process, and even are completely opposite deflection processes (for example, the previous whole process is composed of two times or more than three times of deflection actions of 'enabling the fins to tilt and restore in sequence', and the later whole process is composed of two times or more than three times of deflection actions of 'enabling the fins to downwards press and restore in sequence'; further for example, the previous whole process is composed of two times or more than three times of deflection actions of 'enabling the fluid acting force direction to deflect to inside of a circumferential tangent and restore in sequence, and the later whole process is composed of two times or more than three times of deflection actions of' enabling the fluid acting force direction to deflect to outside of the circumferential tangent and restore in sequence. Because the two times of deflection processes of the acting force are opposite, the driving force in the horizontal direction produced by two times of deflection inevitably has opposite directions, and the flying saucer may obtain force needed by turning left and right and flying backwards).

Sub-solution 3: the sub-solution is similar to the general solution, and the wingspan orientations or the angles of attack of the fins are changed in the fin deflection process.

Change of the wingspan orientations refers to change of included angles between the wingspan orientations and the axis of the wing ring or the coleopter. By changing the wingspan orientations, the flying saucer may be driven to forward fast via the fins, and the flying saucer may also be maintained in a horizontal attitude (the axis does not incline). By changing the angles of attack of the fins, the fins may wholly deflect by the angles of attack (such as whole deflection of fins of some large three-blade wind turbines), or only flaps, ailerons or slats deflect (such as most of the aircraft wings). By changing the angles of attack of the fins, the axis of the flying saucer tilts forwards, so that power in the horizontal direction is formed from the whole lift, thereby driving the flying saucer to move forwards.

Sub-solution 4: the sub-solution is similar to the sub-solution 1, and two specific sections become a section group in midpoint symmetry.

The 'midpoint' refers to a point through which the specific section may be segmented into two equal parts, and the two 'midpoints' are separately located on two intersection points of the same circumference and the same diameter (shown as q and Q in FIG. 5). On the basis of symmetry of the two midpoints, a and A may be symmetrical and b and B are symmetrical as shown in FIG. 5 (but the present invention may be realized even if the midpoints are not symmetrical). Herein, two sections of which the midpoints are symmetrical are called the 'section group with midpoint symmetry'.

Sub-solution 5: the sub-solution is similar to the sub-solution 4, and the quantity of the section groups is more than 1.

Sub-solution 6: the sub-solution is similar to the sub-solution 4, and fins on the same wing ring have opposite wingspan orientations in the two specific sections, thereby obtaining greater thrust and preventing the annular truss from being flattened by pull or extrusion. The term of 'opposite wingspan orientations' refers to a situation shown as FIG. 8, that is, one end of the fins deflecting and warping upwards while passing by a section ab deflects and submerges downwards while passing by a section AB (the sections ab and AB are as shown in FIG. 5).

II. Technical Solutions of Dynamic Deflection Coleopter

A dynamic deflection coleopter belongs to annular rotorcrafts, annular propeller machines or annular wind turbines.

General solution: at least 2 fins or fluid generators on the same circumference of the wing ring are equipped, with deflection mechanisms. Each deflection mechanism is capable of deflecting on the specific section and completely restoring or basically restoring to a state before deflection after passing by the specific section, and the deflection mechanism is a mechanism capable of changing wingspan orientations or/and angles of attack of fins, or a mechanism capable of changing a direction of an acting force produced by fluid generators. A fin deflection device can change the wingspan orientations or/and the angles of attack of fins, and a deflection device of the acting force produced by the fluid generators can change an included angle between the direction of the fluid acting force and a circumferential tangent of the wing ring.

Sub-solution 1: the sub-solution is similar to the general solution, the number of wing rings is not less than two, and at least two wing rings have the same center of a circle but different radiuses.

Sub-solution 2: the sub-solution is similar to the general solution; the number of wing rings is not less than two; a radial channel engine room exists (an engine room built along a radius or diameter direction); and the radial channel engine room independently exists (referring to existence of only the radial channel engine room, but not referring to that one radial channel engine room can only exist), or forms a combined engine room with an annular engine room or/and a central radial channel engine room.

Sub-solution 3: the sub-solution is similar to the general solution; at least one centripetal force device exists on the wing ring; and not less than three centripetal force devices of the same kind exist on the same circumference and are arranged in a ring array. The centripetal force devices are devices capable of producing an acting force pointing to the axis of the wing ring.

The centripetal force devices have diversified forms, wherein the centripetal force devices with the most convenient application include fins and fluid generators on the wing rings.

For lift wings making circular motions along with rotation of the wing rings, when one side of the lift wings at lower air pressures inclines or faces the axis of the wing rings (shown as fin 5 in FIG. 28, FIG. 29 and FIG. 30 or fin 6 in FIG. 31), the lift of the fins may produce a component force towards the axis of the wing ring, which becomes a centripetal force source.

For fluid generators which push the wing rings to rotate and make circular motions along with the wing rings, when the acting force direction of fluid of the fluid generators deflects to the outside of a tangent of a trajectory of the circular motions, centripetal force is also produced.

The 'tangent of a trajectory of the circular motions' refers to a tangent of a circular trajectory formed by circular motions of a jet orifice of fluid (such as a high-pressure airflow) or a similar part (such as the center of a circle of a propeller). As shown in FIG. 32, AC is the tangent, and AD is fluid jet (an injection direction). By taking the tangent AC as a boundary, one side where an arc AB is located is the inside of the tangent, and the other side (that, is, one side where the fluid jet AD is located) is the outside of the tangent.

Beneficial Effects (I) Beneficial Effects of High-Speed Flight Method and Dynamic Deflection Coleopter 1. The technical solution is a unique technical solution capable of realizing high-speed flight of the wing ring flying saucer (that is, the disk coleopter or annular coleopter).

2. An extra engine capable of specially providing driving force in the horizontal direction is completely not needed, and the flying saucer may rapidly advance, turn, brake or invert at high speed.

3. Building cost is greatly reduced, and dead weight of the flying saucer is greatly reduced.

4. Energy consumption and air pollution are greatly decreased.

5. The coleopter may be prevented from being flattened by extrusion or pull during high-speed flight.

6. Pull crack of partial centrifugal force to the annular truss may be offset, so aims of weakening the weight of the annular truss and obviously increasing a net load are achieved.

(II) Beneficial Effects of Disk Coleopter

1. The fins on different radiuses may obtain the same linear velocity (airspeed), which is favorable for maximizing the whole lift and mechanical strength.

2. A wing ring flying saucer with an outer ring engine room is provided, and the old way that the engine room of the disk aircraft may be located on the axis only is broken.

3. Sightseeing windows, passenger and freight distribution channels and an effective carrying space of the wing ring flying saucer are greatly increased.

4. Passenger and, freight distribution ports, are greatly increased; the speed of logistics may be greatly increased; particularly the express distribution speed and safety degree are increased; and the cost of logistics and express is reduced.

DESCRIPTION OF THE DRAWINGS

I. List of Reference Numerals 1. annular truss of wing ring; 2. annular truss of outer wing ring; 3. annular truss of inner wing ling; 4. sliced airfoil; 5. airfoil; 6. arc-shaped airfoil; 7. virtual connection of two ends of arc-shaped airfoils; 8. airfoil with non-deflectable angle of attack and wingspan orientation; 9. airfoil with deflectable angle of attack and wingspan orientation; 9-1. handle of airfoil 9; 10, hydraulic telescopic rod; 11. first rotating shaft (dynamic connection point between hydraulic telescopic rod 10 and annular truss 2 of outer wing ring or airfoil 8); 12. second rotating shaft (dynamic connection point between handle of airfoil 9 and handle 9-1 of airfoil); 13. third rotating shaft (dynamic connection point between hydraulic telescopic rod 10 and handle of airfoil 9); 14. fourth rotating shaft (dynamic connection point between hydraulic telescopic rod 10 and annular truss 3 of inner wing ring); 15. annular engine room; 15-1. annular engine room of smaller radius; 15-2. annular engine room of larger radius; 16. annular engine room; 17. radial engine room; 18. cross section of annular truss of upper wing ring; 19. cross section of annular truss of lower wing ring; 23. jet engine; 24. air inlet of jet engine; 25. jet hole of jet engine; 26. bearing connecting jet engine and airfoil or annular truss; 27. bearing connecting jet engine and top of hydraulic telescopic rod; 28. propeller engine; 29. connecting rod; 30. dynamic connection point between connecting rod 29 and airfoil 8; 31. dynamic connection point between hydraulic rod 10 and connecting rod 29; 39. circular orbit with groove-type cross section (orbital ring); 40. frame ring (annular frame); 41. wheel of track car; 44. track coupling ring; 45. flying saucer advancing direction; and 46. wing ring rotation direction.

II. Brief Description of Drawings

PREFERRED EMBODIMENTS OF THE PRESENT INVENTION

Embodiment 1

Figure 1B:
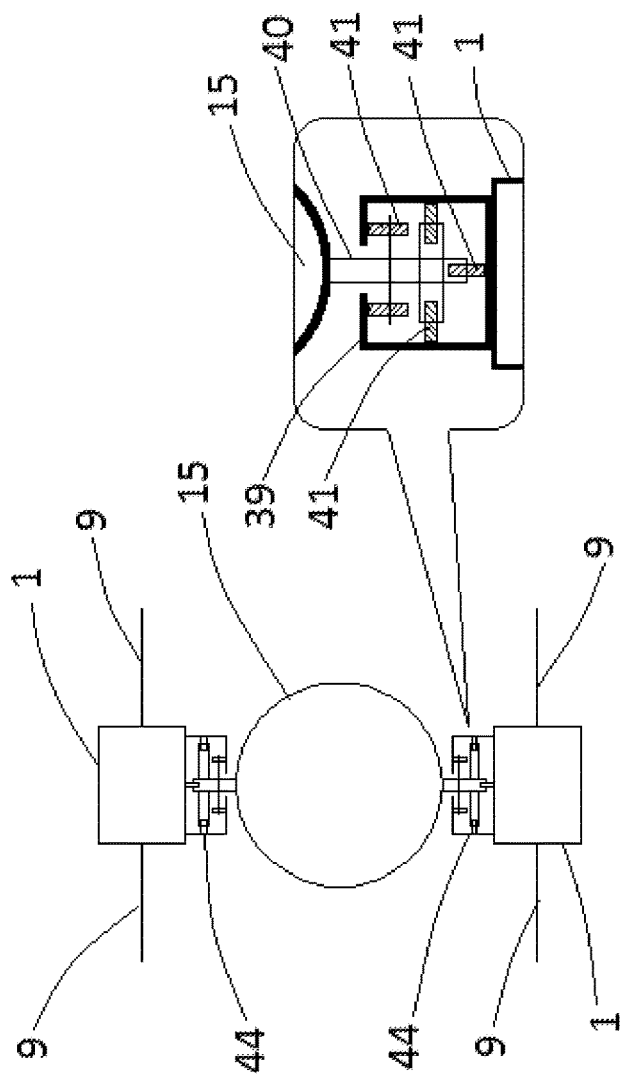
FIG. 1(A) and FIG. 1(B) are structural schematic diagrams of a wing ring flying saucer (a section cutting plane drawing passing through diameter and axis)
Figure 1A:
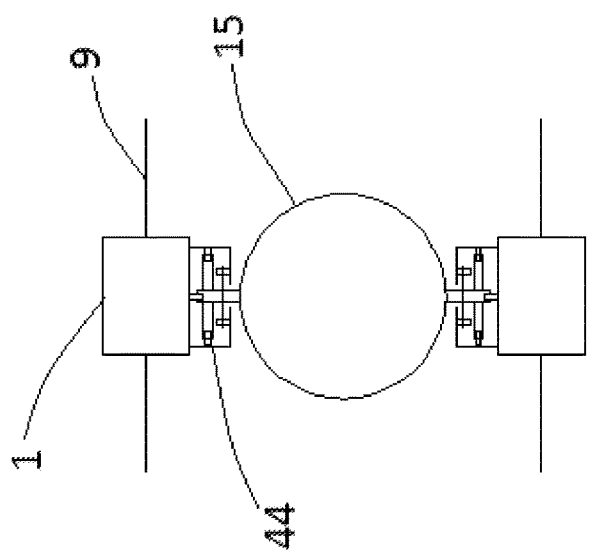
Figure 2:
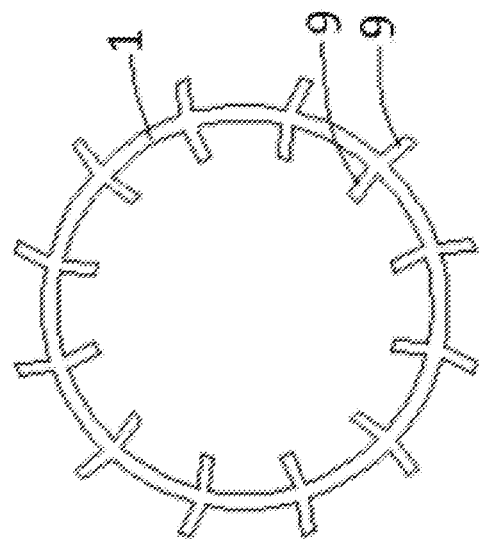
FIG. 2 is a structural schematic diagram (top view) of a wing ring.

A wing ring flying saucer is formed by connecting two wing rings shown in FIG. 2 and an annular engine room 15. A specific connection manner is shown in FIG. 1 (a disk coleopter is formed by two wing rings, two track coupling rings 44 and an annular engine room 15, and the annular engine room 15 is in dynamic connection with two wing rings 1 by virtue of two upper and lower track coupling rings 44).

In the present embodiment, the two wing rings have opposite rotation directions, the fin 9 has lift airfoil, and one upward side of the fin has a lower air pressure than one downward side during air cutting.

An engine in the present embodiment adopts a motor or an internal combustion engine. The engine is mounted at an appropriate position of an annular frame (frame ring) 40; the engine and a wheel 41 of a track car are in power connection; the wheel 41 is driven to rotate by the engine; and an annular track (track ring) 39 is driven to rotate by the wheel 41. Because the track ring 39 is fixedly connected with the wing ring, the wing ring will rotate along with the track ring 39.

The quantity of engines is determined according to power demands. Each wheel 41 may be equipped with an engine, or each wheel set is equipped with an engine, or every several wheel sets are equipped with an engine.

Figure 3:
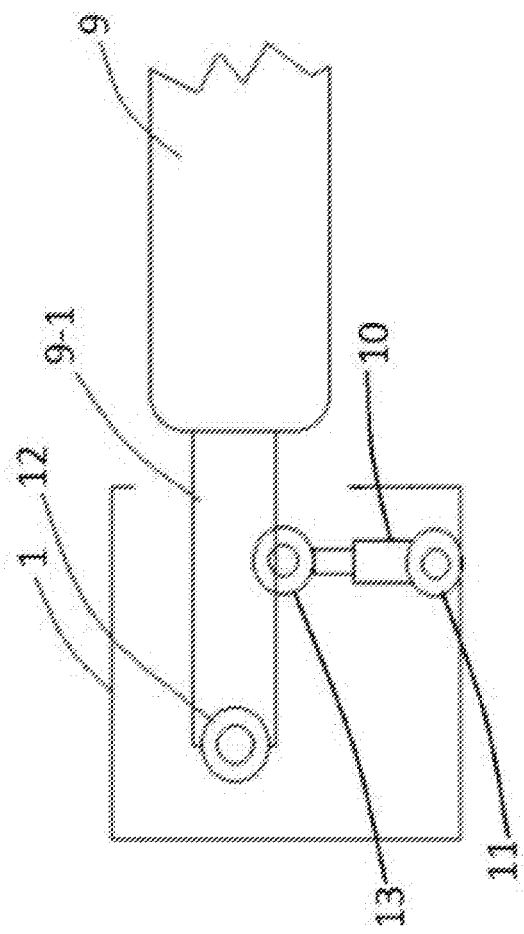
FIG. 3 is a schematic diagram of a connection manner of a fin 9 on a wing ring shown in FIG. 2 and an equipped deflection device and an annular truss 1 (a schematic diagram of a cross section, on an annular truss of the wing ring)

Key Configuration is as Follows:

A connection manner of each airfoil 9 and an annular truss 1 of the wing ring can be seen in FIG. 3 (the annular truss shown in drawings of the description; except the FIG. 2, FIG. 4, FIG. 18, FIG. 24, FIG. 26 and FIG. 27 are top views of the complete annular truss, each of the rest is a cross section of the annular truss). A lower end of a handle 9-1 of the airfoil 9 is in dynamic connection with the annular truss 1 by virtue of a second rotating shaft 12. The top of a hydraulic rod 10 is in dynamic connection with the handle 9-1 of the airfoil 9 by virtue of a third rotating shaft 13; and the bottom of the hydraulic telescopic rod 10 is in dynamic connection with the annular truss 1 by virtue of a first rotating shaft 11.

Figure 4:
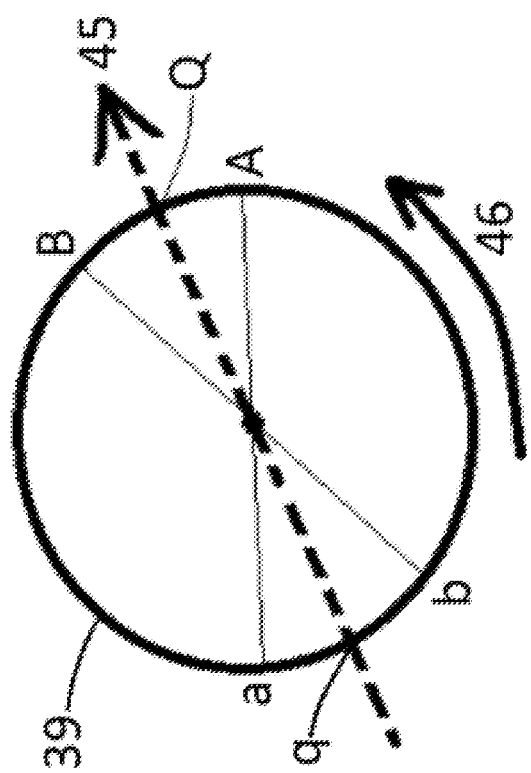
FIG. 4 is a schematic diagram of a principle of a dynamic deflection coleopter.

Then, two groups of signal emitters X1 and X2 are arranged on an annular engine room 15, and specific orientations of the signal emitters are located at directions X1 and X2 in FIG. 4. The group X1 includes three signal emitters a, q and b, and the group X2 includes three signal emitters A, Q and B (shown in FIG. 5).

Meanwhile, a signal receiver is arranged on each fin 9. Tasks of the signal receivers are to receive signals transmitted thereby while passing by the signal emitters a, q, b, A, Q and B along with the fins and to transmit the signals to a control device of the motor. The control device executes a signal instruction to enable the motor to forward, reverse and stop, thereby enabling the hydraulic telescopic rod 10 to lengthen, shorten and stop.

Figure 6:
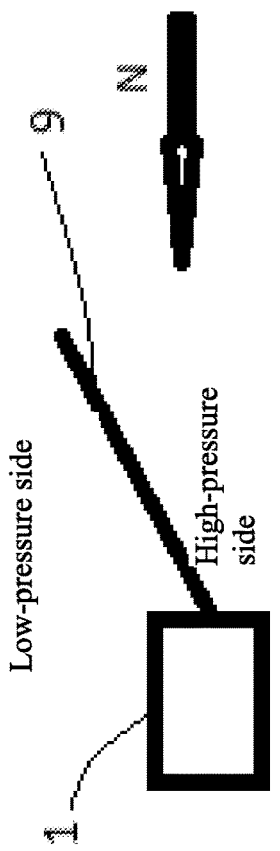
FIG. 6(A) and FIG. 6(B) are schematic diagrams of a principle of deflecting, a wingspan orientation to obtain horizontal driving force.
Figure 6:
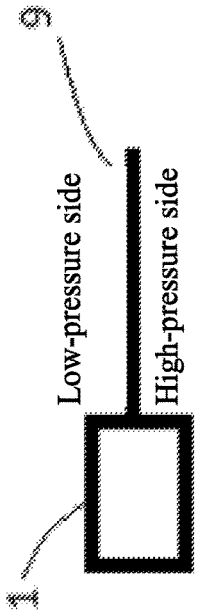
Figure 7:
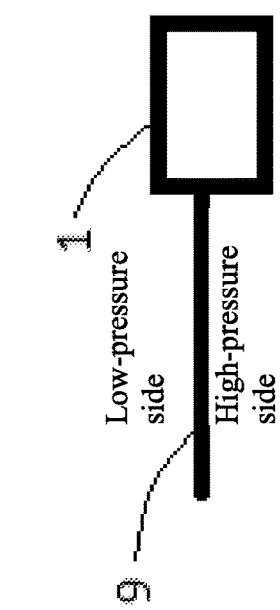
FIG. 7(A) and FIG. 7(B) are schematic diagrams of a principle of deflecting a wingspan orientation to obtain horizontal driving force.
Figure 7:
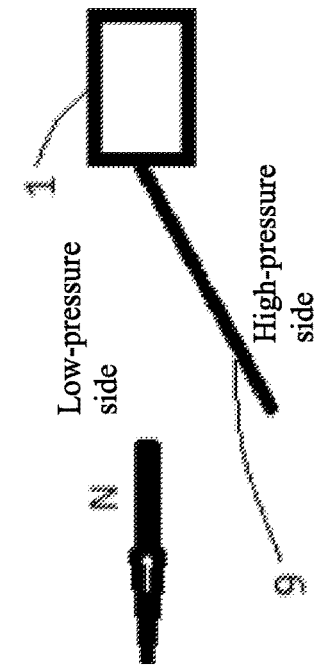

The two groups of signal emitters X1 and X2 of the small low-speed wing ring flying saucer should be decreased by one. Since only one section of bearing capacity N remains (shown in FIG. 6 or FIG. 7), when the force N is too high, the round wing ring should be prevented from being flattened by extrusion or pull so as to avoid hindering mechanical property.

Figure 8A:
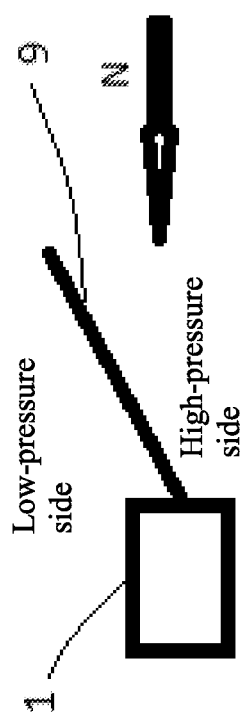
FIG. 8(A) and FIG. 8(B) are schematic diagrams of a principle of deflecting a wingspan orientation to obtain horizontal driving force.
Figure 8B:
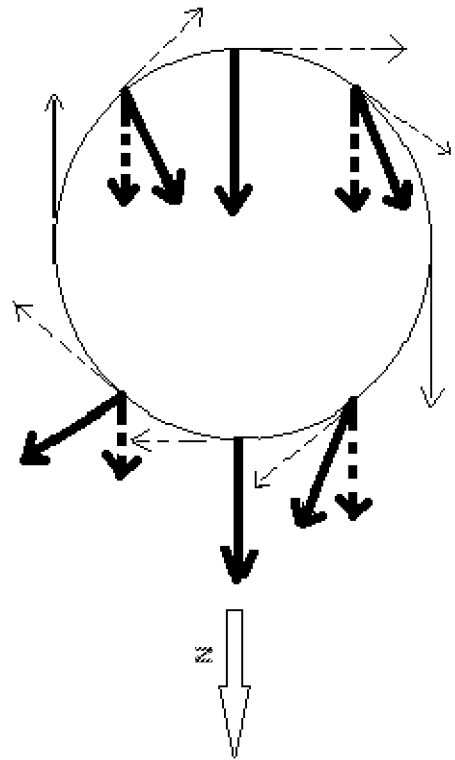

Therefore, a large or high-speed wing ring flying saucer should enable the X1 and X2 to simultaneously bear the equal force N (shown in FIG. 8). Thus, the following configuration must be made:

1. b and B always transmit motor stop signals only, so that the hydraulic rod is maintained in an initial state;

2. the signals transmitted by q and Q must be opposite, and the signals transmitted by a and q must be opposite, which aims to enable the hydraulic rod to change from a lengthening (or shortening) state to a shortening (or lengthening) state;

3. the signals transmitted by q and Q must be opposite, and the signals transmitted by a and A must be opposite, which aims to enable the fins to have opposite wingspan orientations in the directions X1 and X2 (shown in FIG. 8);

4. an initial length of the hydraulic telescopic rod 10 is a length needed for fixing the wingspan orientation at an initial angle, and an appropriate expansion quantity must be reserved, so that the hydraulic telescopic rod can stretch out when located at the initial length and can also retract when located at the initial length, and the stretch limit length is equal to the retraction limit length; and 5. the signal receivers can receive signals transmitted from each point only when arrive at the points a, q, b, Q and B only, and then execute the instruction (not interfered by signals on other points);

A lift mechanism of the wing ring flying saucer is a coleopter, while the coleopter only can transmit upward lift. In the present embodiment, a stable component force in the horizontal direction may be obtained from the upward lift of the coleopter (force N in FIG. 6, FIG. 7 and FIG. 8).

With the above configuration, when the airfoil 9 passes by the point a or A, the signal receiver of the airfoil receives a forward or reverse instruction to enable a forward circuit or a reverse circuit to be connected, the motor rotates forwards or reversely, and the hydraulic telescopic rod 10 is, driven to lengthen or retract, so that the airfoil 9 warps or press downwards, a wingspan inclining angle is continuously enlarged, and the component force in the horizontal direction is continuously increased. In a similar way, when the airfoil 9 passes by the point q or Q, the signal receiver of the airfoil receives a reverse or forward instruction to enable the motor to rotate reversely or forwards, and then the hydraulic telescopic rod 10 starts to retract or stretch; a wingspan inclining angle starts to continuously narrow, and horizontal thrust is continuously decreased. In a similar way, when the airfoil 9 passes by the point b or B, the signal receiver of the airfoil receives a stop instruction, the motor stops rotating, and the hydraulic telescopic, rod 10 stops; at this moment, the hydraulic telescopic rod 10 just retracts (or lengthens) to the initial length; the airfoil 9 just restores to an initial wingspan angle; and the airfoil 9 stops producing horizontal thrust. Since each airfoil follows up the previous airfoil, when the horizontal thrust produced by the previous airfoil is continuously decreased, horizontal thrust produced by the next airfoil is continuously increased. Therefore, continuous and stable power in the horizontal direction can be obtained.

Embodiment 2

On the basis of embodiment 1, two groups of symmetrical signal emitters are increased in directions Y1 and Y2 of an annular engine room 15; the configuration method is just the same as that, of two groups in the directions X1 and X2, but just the locations, are different (shown in FIG. 4). When only advancing is needed, the X1 and X2 should be started only, and the Y1 and Y2 are started when turning is needed.

Embodiment 3

On the basis of embodiment 1 or embodiment 2 the original four signal emitters a, A, q and Q capable of emitting forward or reverse signals alone in the directions Y1 and Y2 are changed into emitters that can emit both forward signals and reverse signals, and a directional control lever of the flying saucer serves as a forward/reverse signal reversing controller. When the control lever is in a vertical state, the signal emitters a, A, q and Q should stop emitting any signal, so that the fin does not deflect while passing by the directions Y1 and Y2; when the control lever is pulled to the left, a left-turning circuit should be connected, and the lower-pressure side of the fin is inclined to the left side of the original advancing direction by virtue of the signals transmitted by the a, A, q and Q (shown in FIG. 8); and when the control lever is pulled to the right, a right-turning circuit should be connected, and the lower-pressure side of the fin is inclined to the right side of the original advancing direction by virtue of the signals transmitted by the a, A, q and Q (that is, the direction of the lower-pressure sides of the two fins 9 is opposite to a direction, shown in FIG. 8).

Left turning and right turning may be easily realized in the present embodiment.

Embodiment 4

On the basis of embodiment 3, the four signal emitters a, A, q and Q in the directions X1 and X2 are configured according to the method in the embodiment 3.

When the directional control lever is pressed forwards, the low-pressure sides of the fins in the directions X1 and X2 lean forward, so the flying saucer can fly forwards; when the directional control lever is pulled backwards, the low-pressure sides of the fins in, the directions X1 and X2 lean backwards, so the flying saucer can rapidly decelerate, realize braking (hovering) in a short distance, and even rapidly change from a forward state to a reverse state (backward inverted flight on premise of not steering or turning round).

Embodiment 5

Each fin or fluid generator of each wing ring is equipped with a deflection device in embodiments 1-4. In the present embodiment, the quantity of fins or fluid generators equipped with deflection devices is decreased; and the quantity can be decreased to a minimum of 1 (when the quantity is more than one, the fins or fluid generators are still arranged in a ring array).

Embodiment 6

Modifications are made on the basis of any of embodiments 1-4 as follows:

The original all fins 9 (and wingspan orientation deflection devices thereof) are replaced with fins (or deflection control devices thereof) of existing aircrafts with flaps, ailerons or/and slats.

The flying saucer may achieve an aim of changing the angle of attack of the fins by deflecting the flaps, ailerons or slats only. Since the angle of attack is changed on the 'specific section' only, the wings produce lift changes on the section, so that the lift on the section is greater than or smaller than that on other sections, thereby causing slight tilt of the wing, rings. Due to tilt of the wing rings, a driving force in the horizontal direction may be decomposed from the whole lift.

Embodiment 7

Modifications are made on the basis of embodiment 1 as follows:

An original wingspan orientation inclining device is replaced with a inclining device of an existing large three-blade wind turbine capable of changing the angle of attack of the airfoils. A airfoil angle-of-attack inclining device of the three-blade wind turbine is arranged inside an annular truss 1 of the wing ling, and the root of the airfoil 9 is connected with the inclining device, so that the inclining device can wholly deflect the airfoil 9, thereby directly changing the angle of attach of the airfoils and obtaining the driving force in the horizontal direction. (The principle of producing horizontal thrust in the present embodiment is the same as that in embodiment 1).

Embodiment 8

Figure 11:
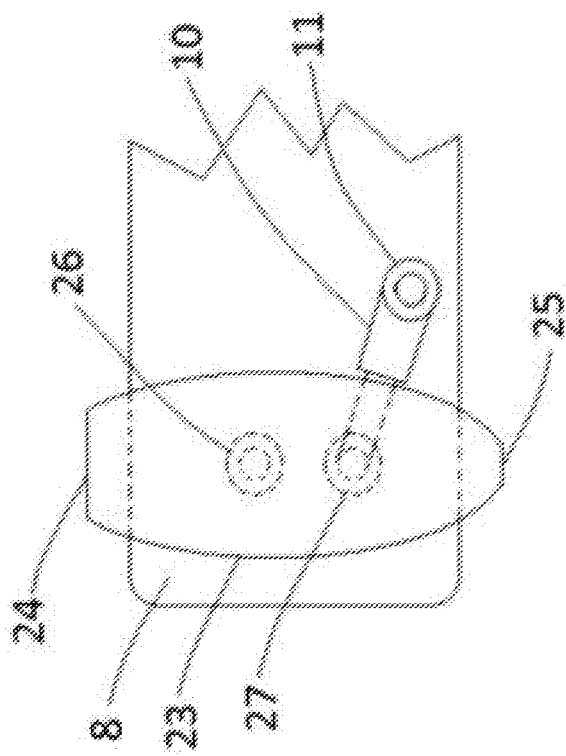
FIG. 11 is a schematic diagram of a jet engine deflection device and a connection manner with a fin.

Modifications are made on the basis of any of embodiments 1-4 as follows:

A fin deflection device equipped on each fin 9 is canceled, so that the fin 9 becomes a fin 8 with a non-deflectable wingspan orientation. Moreover, a jet engine 23 is arranged at the tail, end of each fin (shown in FIG. 11), the jet engine 23 is in dynamic connection with the fin 9 by virtue of a bearing 26, and a hydraulic rod 10 is in dynamic connection with a wing ring 9 by virtue of a bearing 11 and is in dynamic connection with the jet engine 23 by virtue of a bearing 27.

Figure 9:
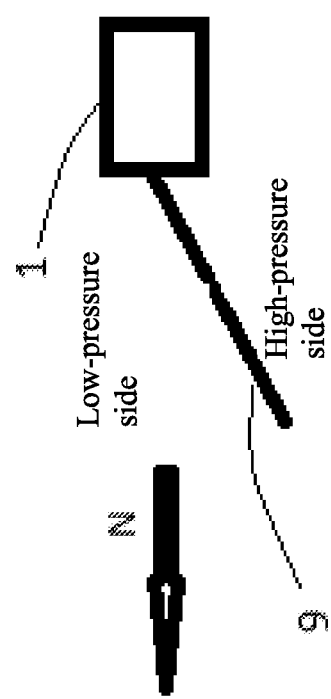
FIG. 9 is, a schematic diagram of a principle of deflecting a fluid jet direction to obtain horizontal driving force.
Figure 10:
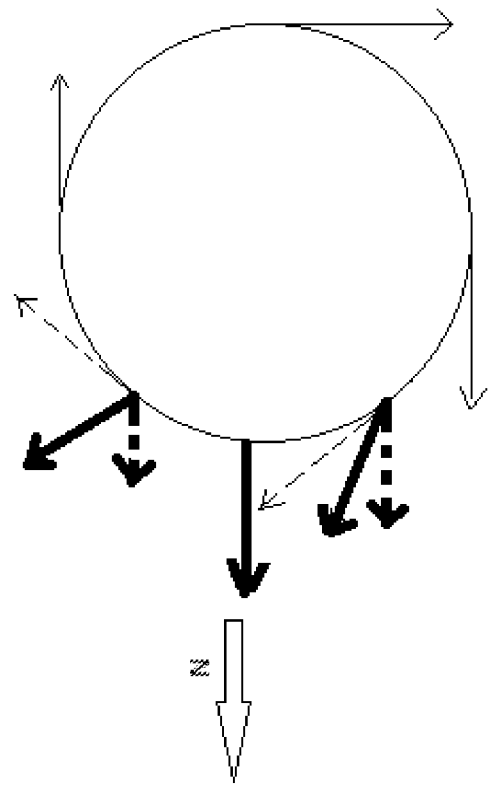
FIG. 10 is a schematic diagram of a principle of deflecting a fluid jet, direction to obtain, horizontal driving force.
Figure 12:
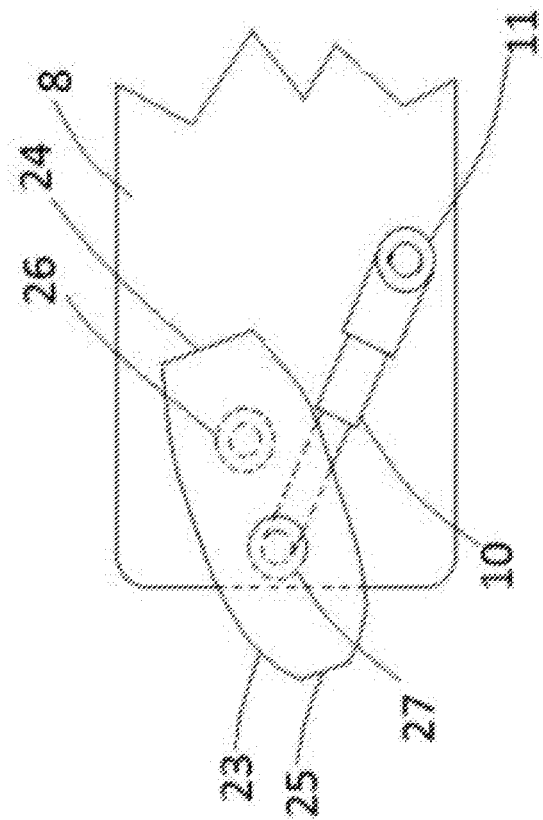
FIG. 12 is a schematic diagram of a jet engine deflection action in FIG. 11.

Thrust produced by the jet engine 23 deviates from a tangential direction on the 'specific section' by controlling the hydraulic rod to stretch and retract (such as a state shown in FIG. 12), thereby producing thrust in the horizontal direction. A specific principle is as follows:

In FIG. 9 and FIG. 10, the circle represents an annular truss of the wing ring, a thick solid arrow represents a direction of acting force given by a fin or fluid generator that runs to the position and deflects by an angle (if the fin or fluid generator runs to the position but does not deflect, the direction of the acting force given thereby is the same as the tangential direction of the wing ring, that is, a direction pointed by a thin dotted arrow in the figure, and thus horizontal driving force is impossible to produce), and a thick dotted arrow in the figure represents a component force of the acting force after deflection in a horizontal advancing direction of the wing ring (that is, the component converted into the horizontal driving force). A thin solid arrow in the figure represents the direction of the acting force given by the fin or fluid generator that runs to the position. Since the fin or the fluid generator does not deflect while running to the position, the direction of the acting force is the same as the tangential direction of the wing ring.

Although each fin or fluid generator during rotating does not continuously produce driving force pointing at the same specific direction, as shown in FIG. 9 and FIG. 10, since each fin or fluid generator may produce horizontal driving force pointing at the same specific direction on the same section, and such a driving force is continuously produced on the same section one by one, a continuous thrust N in the horizontal direction with stable size and direction in one specific direction is formed on the section.

Figure 5:
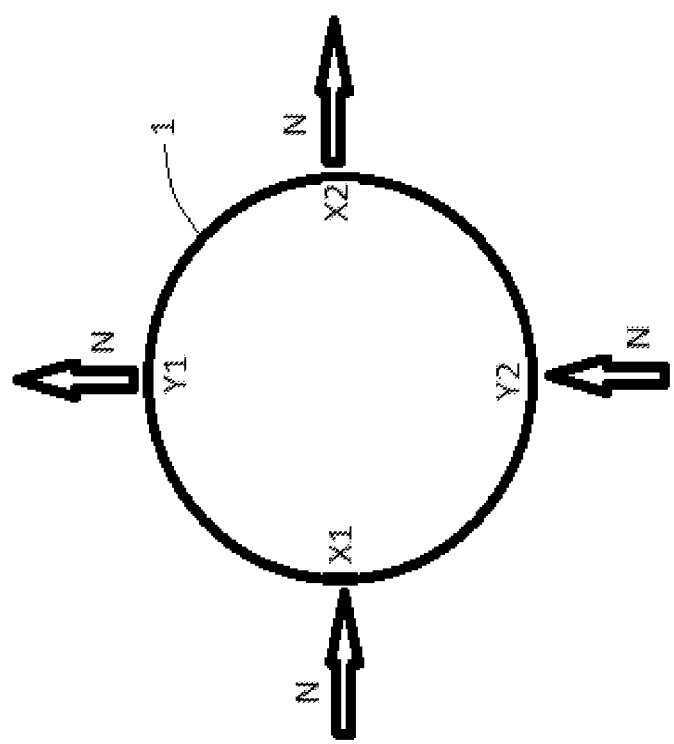
FIG. 5 is a schematic diagram of a deflection path setting method for fins or fluid generators providing level flight power.

Notes: FIG. 9 shows a situation of a deflection power orientation on one section only, while FIG. 10 shows a situation of a deflection power orientation on two sections simultaneously (the two paths refer to a path from the sections a to b and a path from the sections A to B as shown in FIG. 5).

Embodiment 9

On the basis of embodiment 8, the jet engines 23 and equipped hydraulic telescopic rods 10 thereof are moved onto the annular truss of the wing ring (all jet engines 23 should be arranged in a ring array).

Embodiment 10

Figure 13:
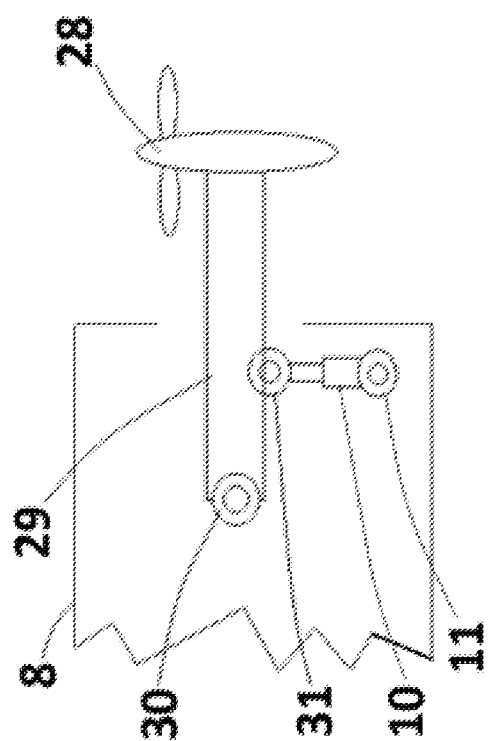
FIG. 13 is a schematic diagram of a propeller engine deflection device and a connection manner with a fin.

On the basis of embodiment 8 or 9, a jet engine 23 is replaced with a propeller engine 28 (as shown in FIG. 13).

Embodiment 11

Figure 15:
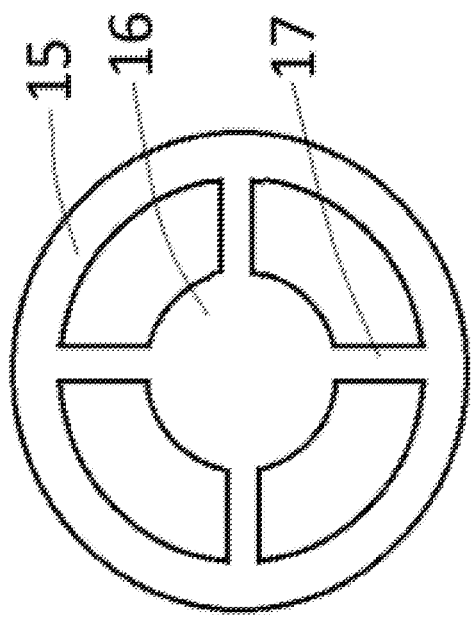
FIG. 15 is a structural schematic diagram (top view) of a combined engine room.

On the basis of any of embodiments 1-9, a circular central engine room 16 and four strip-shaped radial engine rooms 17 are increased, and the radial engine rooms 17 are connected from four directions and communicated with the central engine room 16 and an annular engine room 15, thereby forming a disk engine room shown in FIG. 15.

Figure 17:
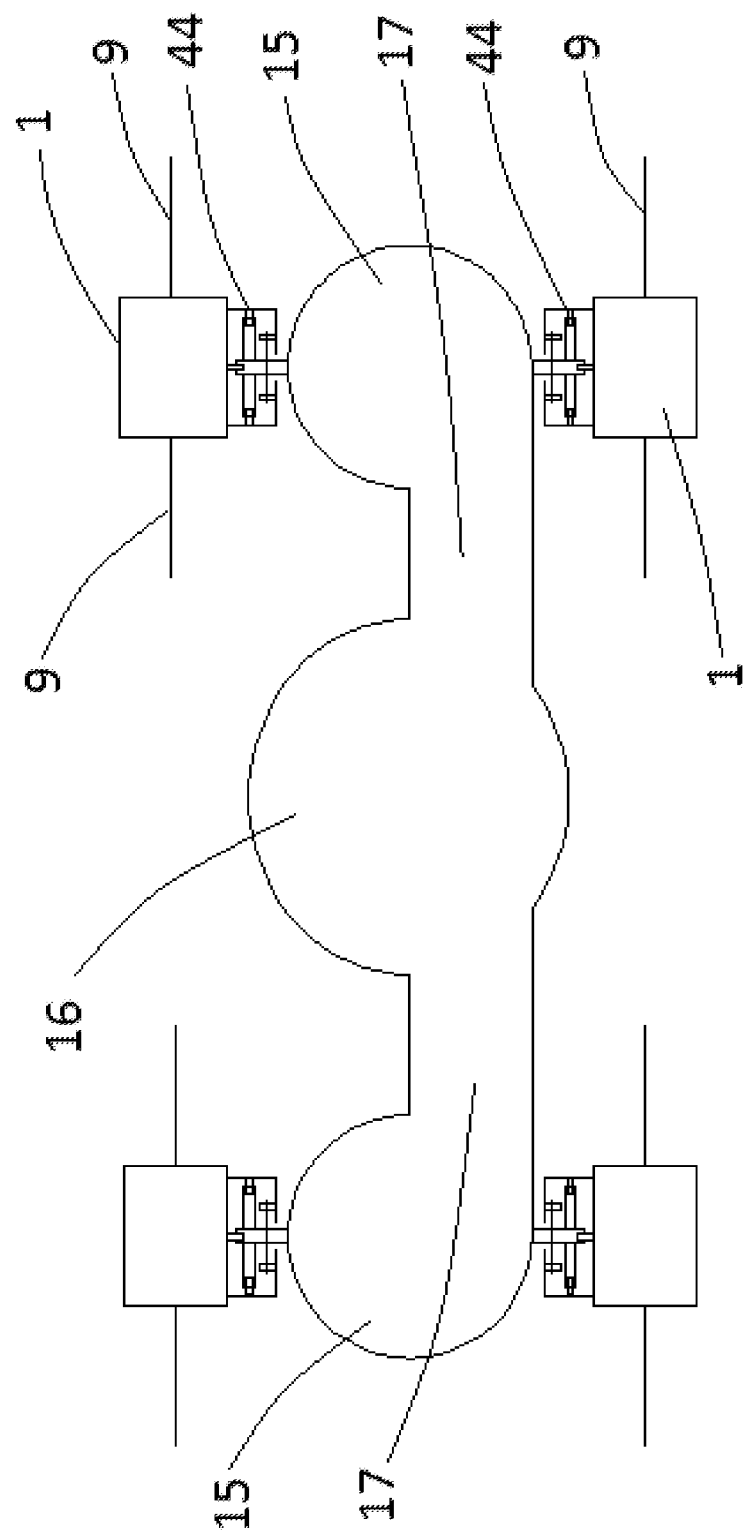
FIG. 17 is a structural schematic diagram of a wing ring flying saucer (a section cutting plane diagram passing through diameter and axis)

FIG. 17 is a schematic diagram of a radial section cutting plane of a wing ring flying saucer in the present embodiment.

Embodiment 12

Figure 18:
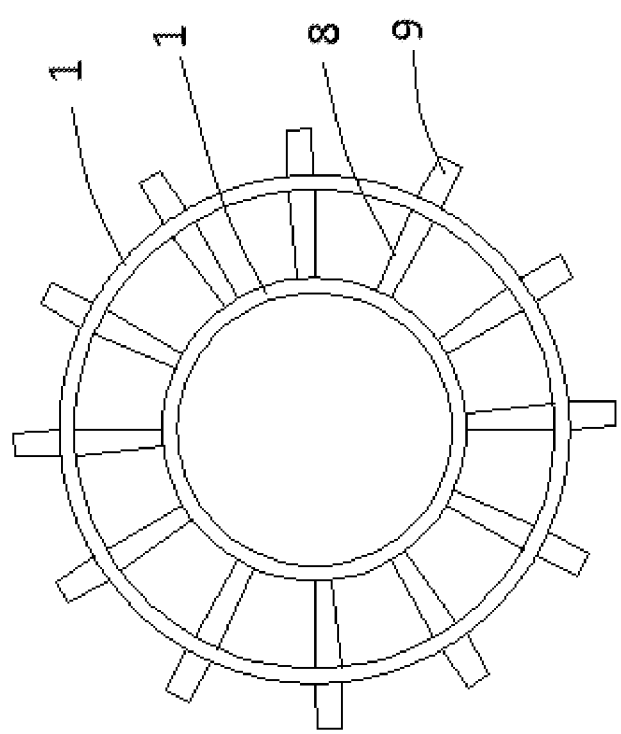
FIG. 18 is a top view of a wing ring.

On the basis of embodiment 11, a scale of the central engine room 16 is enlarged; the originally configured wing rings shown in FIG. 2 are replaced with wing rings shown in FIG. 18; the connection manner of deflection devices of fins 9 and the annular truss of the wing rings is identical to that in embodiment 11; and two ends of fins 8 are respectively fixedly connected with two annular trusses.

Figure 19:
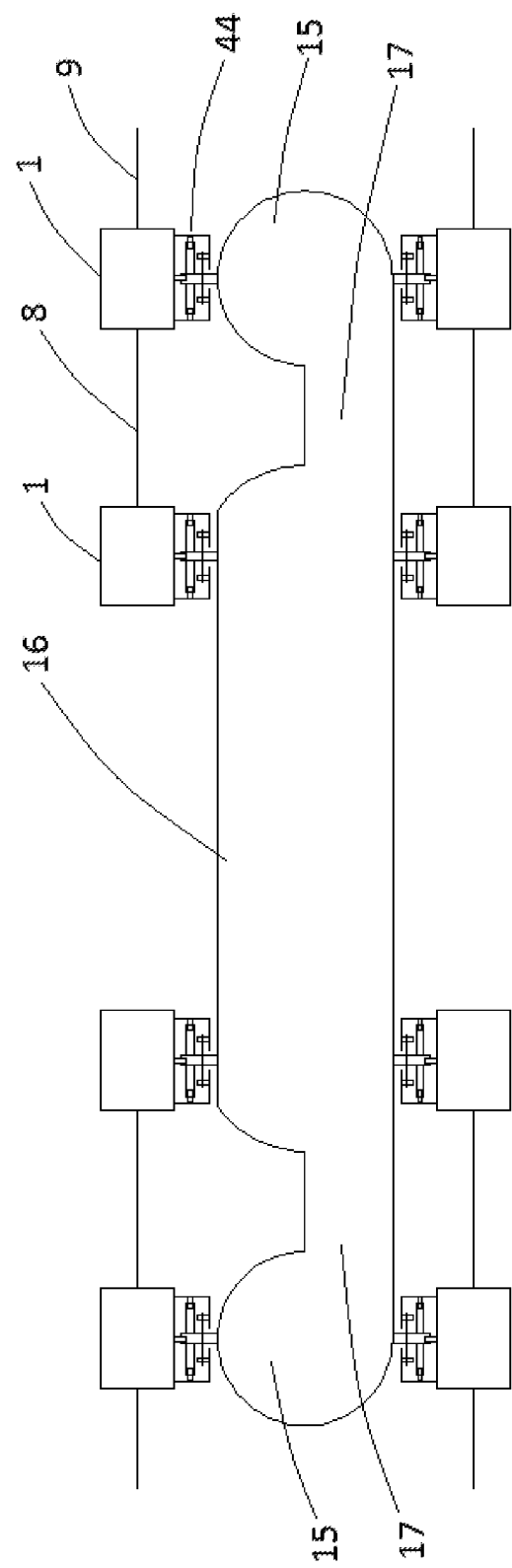
FIG. 19 is a structural schematic diagram of a wing ring flying saucer (a section cutting plane diagram passing through diameter and axis)

The whole radial section cutting plane is shown in FIG. 19.

Embodiment 13

Figure 25:
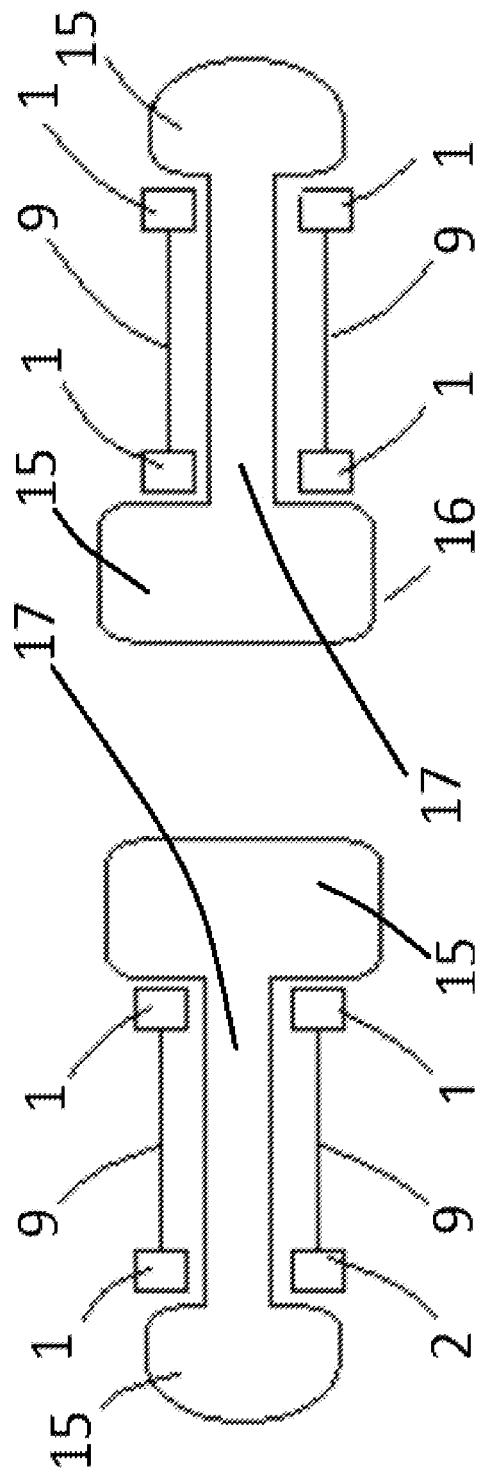
FIG. 25 is a structural schematic diagram of a wing ring flying saucer (a section cutting plane diagram passing through diameter and axis)

On the basis of embodiment 12, the original fins 9 are canceled, so that a top view of the wing rings is as shown in FIG. 25. Two ends of each, fin 9 of the wing ring are connected with two annular trusses 1, and the connection manner is as shown in FIG. 14.

Figure 20:
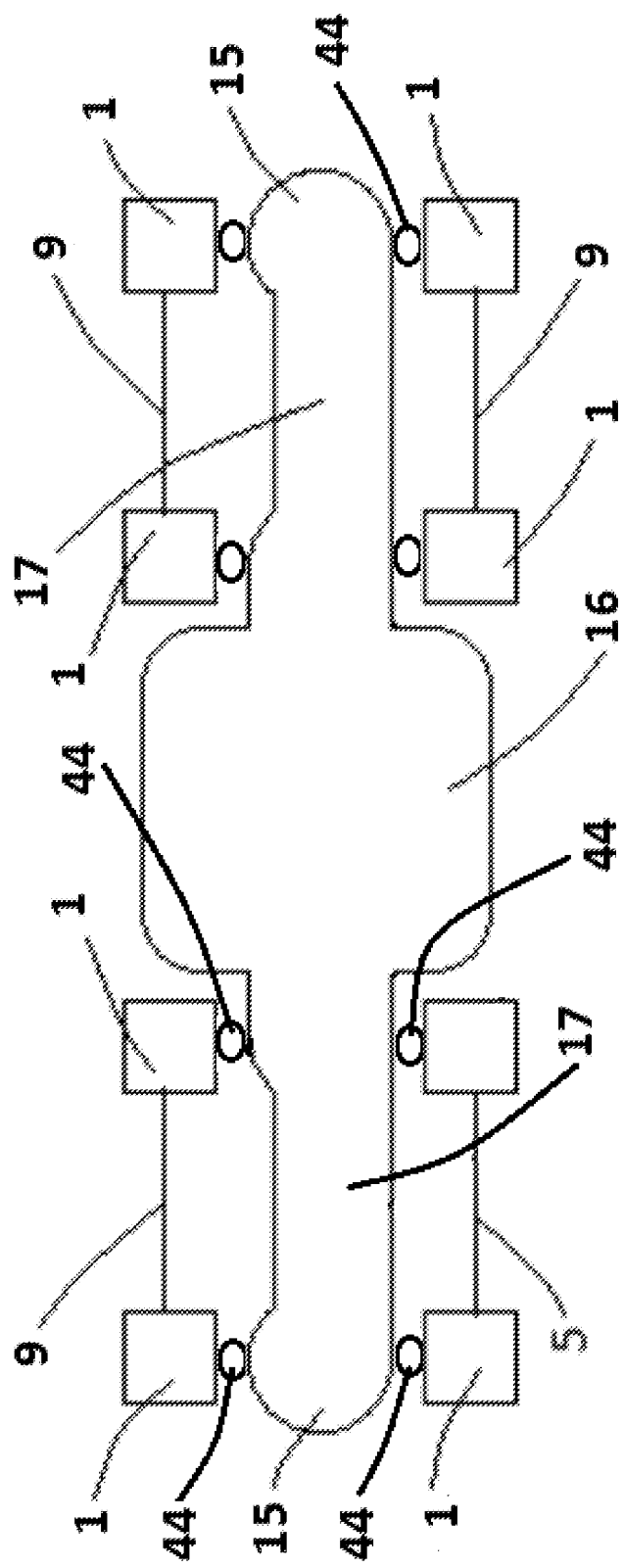
FIG. 20 is a structural schematic diagram of a wing ring flying saucer (a section cutting plane diagram passing through diameter and axis)

The whole radial section cutting plane in the present embodiment is shown in FIG. 20.

Figure 14:
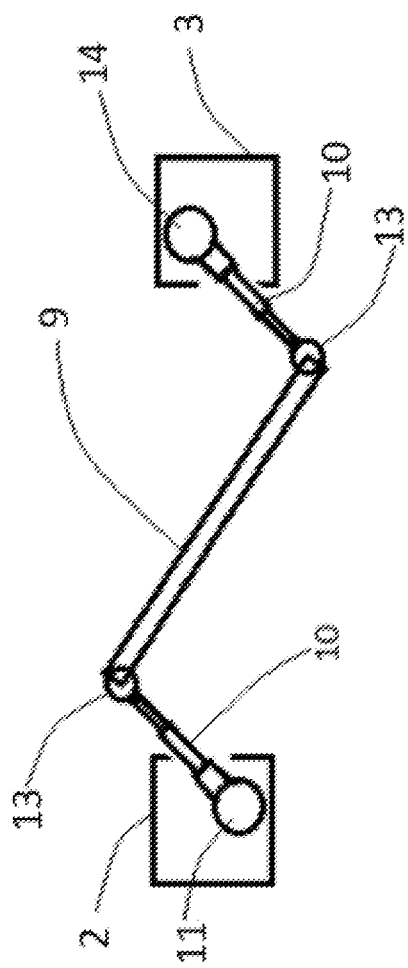
FIG. 14 is a schematic diagram of a manner of connecting two ends of a fin 9 with two annular trusses with the same center of circle and different radiuses by virtue of a deflection device.

When horizontal flight power needs to be provided, one (or two) hydraulic rods) 10 shown in FIG. 14 is (are) started, so that the fins 9 produce wingspan orientation deflection. If the two hydraulic rods are started simultaneously, the wingspan orientation of the fins 9 may deflect faster.

Embodiment 14

Figure 21:
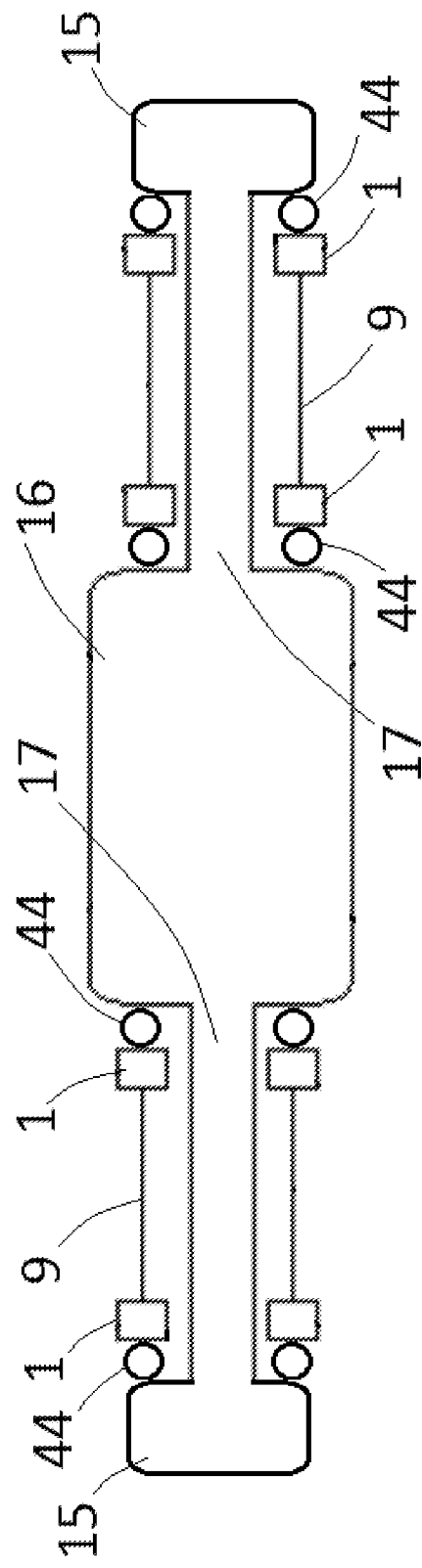
FIG. 21 is a structural schematic diagram of a wing ring flying saucer (a section cutting plane diagram passing through diameter and axis)

On the basis of embodiment 13, the shape of the engine room is further changed, and a track coupling ring 44 is transferred, so that the annular truss 1 of the wing ring and the engine room are changed from an upper-lower connection manner to a left-right connection manner. The whole radial section cutting plane in the present embodiment is shown in FIG. 21.

The advantage of changing to the left-right transverse connection is that the weight of the track coupling ring is reduced, and the number of wheels on, each track car may be decreased from 5 to 3 (only one wheel is arranged on the upper and lower sides respectively, and one wheel is arranged on the left or right).

Embodiment 15

Figure 22:
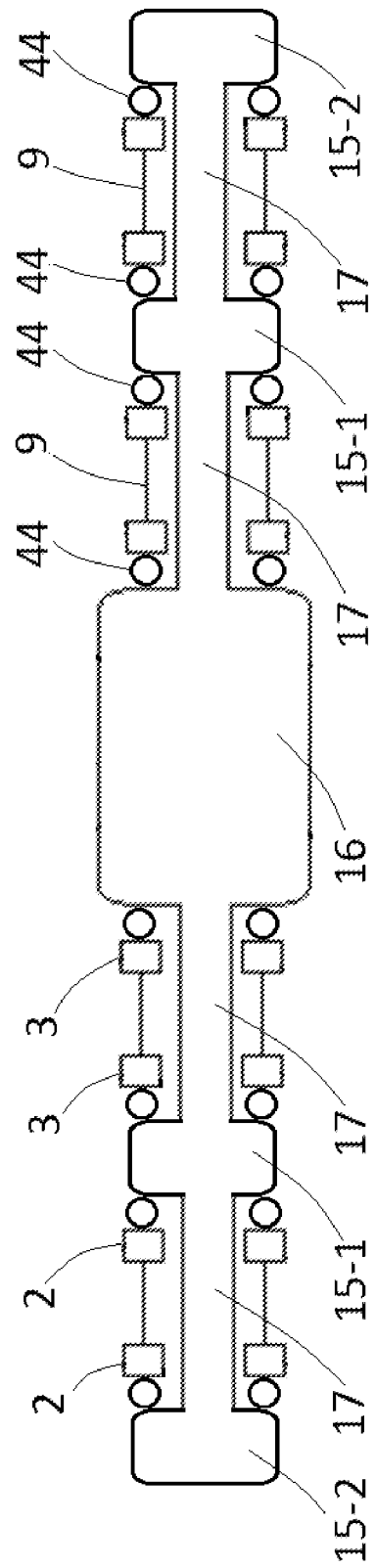
FIG. 22 is a structural schematic diagram of a wing ring flying saucer (a section cutting plane diagram passing through diameter and axis)
Figure 24:
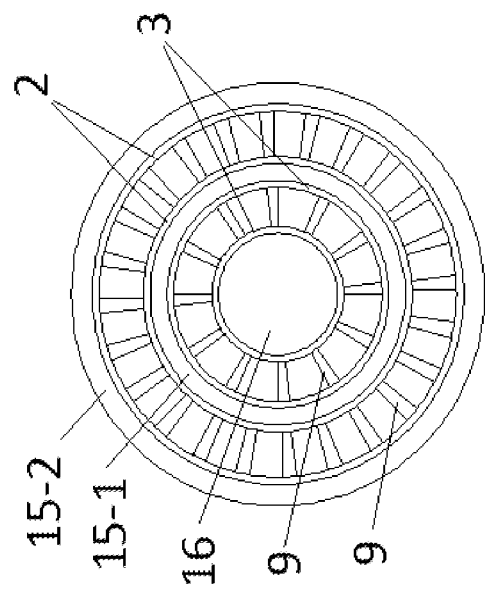
FIG. 24 is a structural schematic diagram (top view) of a wing ring flying saucer.

On the basis of embodiment 14, the weight of the flying saucer is further increased. The whole side view of the present embodiment is shown in FIG. 22, and the top view is shown in FIG. 24.

The wing ring adopted in the present embodiment is composed of two wing rings having the same center of circle and different radiuses. Rotation directions of the two wing rings having different radiuses on the same layer may be the same or opposite, while rotation directions of any two wing, rings having the same radius on different layers must be opposite.

Since the two wing rings on the same layer do not have to rotate at the same angular velocity, fins on different radiuses may obtain the same linear velocity (airspeed), thereby maximizing the whole lift and mechanical strength.

Embodiment 16

Figure 23:
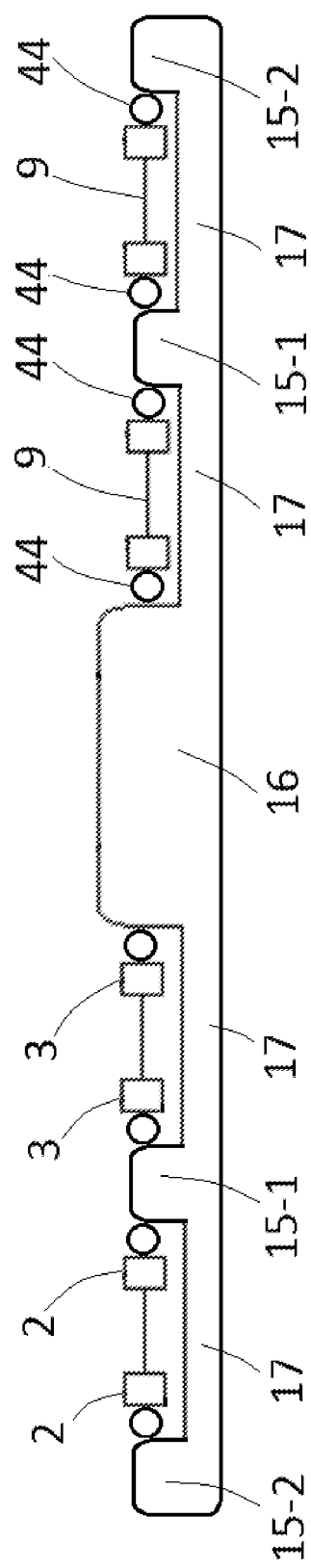
FIG. 23 is a structural schematic diagram of a wing ring flying saucer (a section cutting plane diagram passing through diameter and axis)

On the basis of embodiment 15, all wing rings on the lower layer and deflection devices and track coupling rings thereof are canceled, and a more flat flying saucer is obtained (shown in FIG. 23).

Embodiment 17

Figure 16:
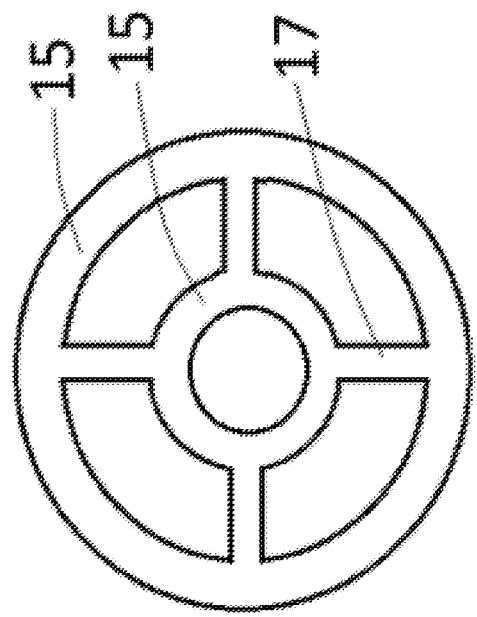
FIG. 16 is a structural schematic diagram (top view) of a combined engine room.

On the basis of embodiment 12, 13, 14 or 15, the engine room is transformed into a shape as shown in FIG. 16. The whole radial section cutting plane in the present embodiment is shown in FIG. 25.

Embodiment 18

On the basis of any of the above embodiments, waterproof sealing is performed on engine rooms, the coleopter, deflection devices and the like, so as to adapt to drop, float and submerging on the water surface (the coleopter may provide advancing power below the water and further accelerate to float or submerge).

Embodiment 19

On the basis of any of the above embodiments, the flying saucer is equipped with an annular or circular airbag so as to drop and, float on the water surface.

Embodiment 20

On the basis of embodiment 18 or 19, the jet engine is replaced with a high-pressure flow generator.

Embodiment 21

On the basis of the above embodiments, undercarriages in a ring array are arranged, and all the undercarriages are connected with an annular engine room 15, a central engine room 16 or an annular frame (frame ring) 40.

Embodiment 22

Two wing rings of the coleopter in the above embodiments are provided with fins or fluid aircraft deflection devices and corresponding signal emitting and receiving devices. In the present embodiment, the deflection devices of one wing ring and the corresponding signal emitting and receiving devices are canceled, so that only one wing ring of the coleopter has the deflection devices and corresponding signal emitting and receiving devices. Therefore, only one wing ring produces a component force in the horizontal direction, which is enough for the coleopter of certain purposes.

Embodiment 23

As shown in FIG. 5, q is the midpoint of a section ab, Q is a midpoint of a section AB, and the two specific sections actually become a section group in midpoint symmetry.

In any of the above preferred embodiments, all the section groups in midpoint symmetry have three pairs of symmetrical points: the first pair is the starting point of the two sections, the second pair is the endpoint of the two sections, and the third pair is the midpoint of the two sections.

In the present embodiment, the length of any section in the section groups is enlarged or shortened, so that the starting points and endpoints of the two sections are asymmetrical (but the two sections are kept in midpoint symmetry).

Embodiment 24

On any wing ring flying saucer, airfoils or fluid generators of wing rings are set to 'repeat the same inclining process while passing by a specific section each time in circular motions of two or more times in succession' by adopting the method in preferred embodiments 1-9.

Embodiment 25

Figure 27:
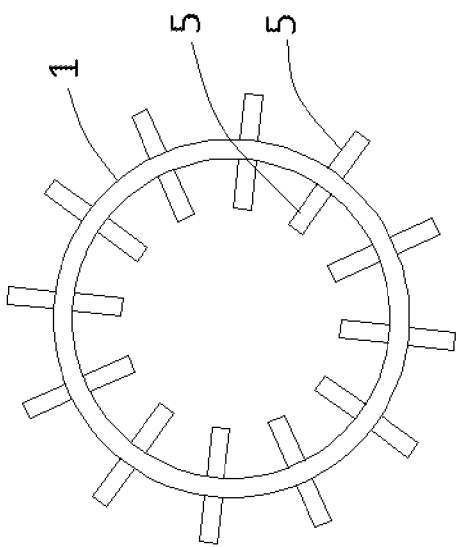
FIG. 27 is a structural schematic diagram (top view) of a wing ring.
Figure 28:
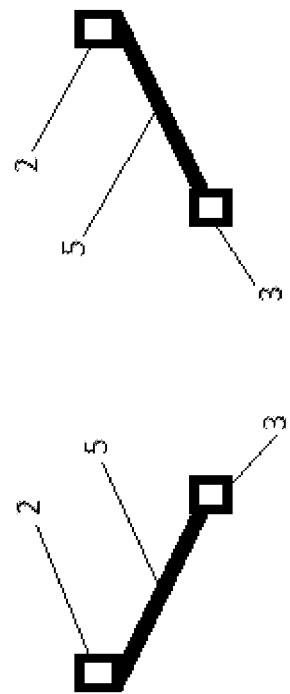
FIG. 28 is a structural schematic diagram of a wing ring (a section cutting plane diagram passing through diameter and axis)

On any wing ring flying saucer, the top view of wing rings (annular rotors, annular propellers, or annular wind wheels) is shown in FIG. 27, and the side view is shown in FIG. 28. Since lower-pressure sides of lift wings are inclined to the axis (wings that produce lift during air cutting), force pointing at the center of the wing ring is produced.

Embodiment 26

Figure 26:
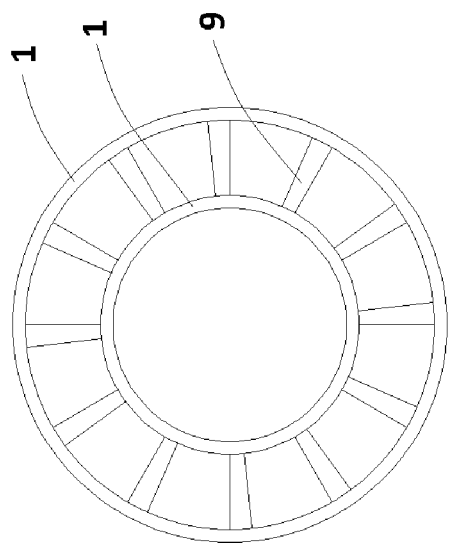
FIG. 26 is a structural schematic diagram (top view) of a wing ring.
Figure 29:
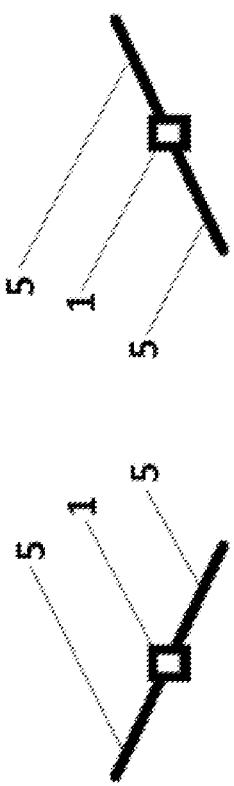
FIG. 29 is a structural schematic diagram of a wing ring (a section cutting plane diagram passing through diameter and axis)

On any wing ring flying saucer, the top view of wing rings (annular rotors, annular propellers, or annular wind wheels) is shown in FIG. 26, and the side view is shown in FIG. 29. Inclined wings have lift wings (lift is produced during air cutting, and the lift points at the axis of the wing ring).

Embodiment 27

Figure 30:
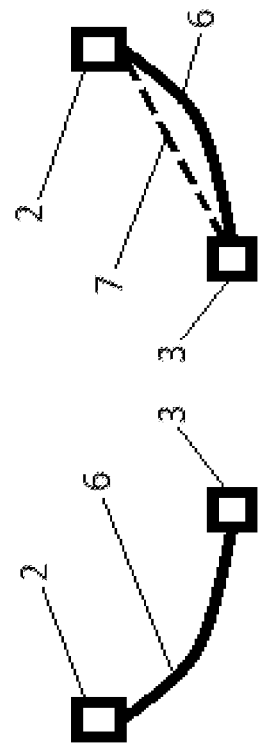
FIG. 30 is a structural schematic diagram of a wing ring (a section cutting plane diagram passing through diameter and axis)

On any wing ring flying saucer, the top view of wing rings (annular rotors, annular propellers or annular wind wheels) is shown in FIG. 26, and the side view is shown in FIG. 30. Inclined wings have lift wings (lift is produced during air cutting, and the lift points at the axis of the wing ring).

Embodiment 28

Figure 31:
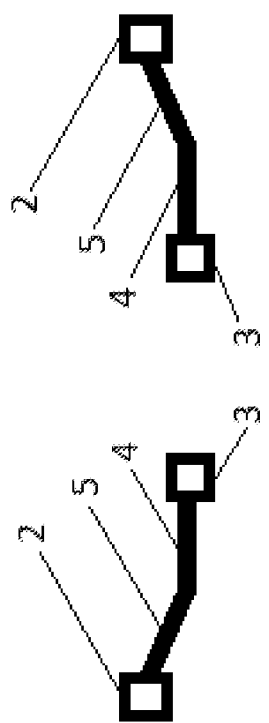
FIG. 31 is a structural schematic diagram of a wing ring (a section cutting plane diagram passing through diameter and axis)
Figure 32:
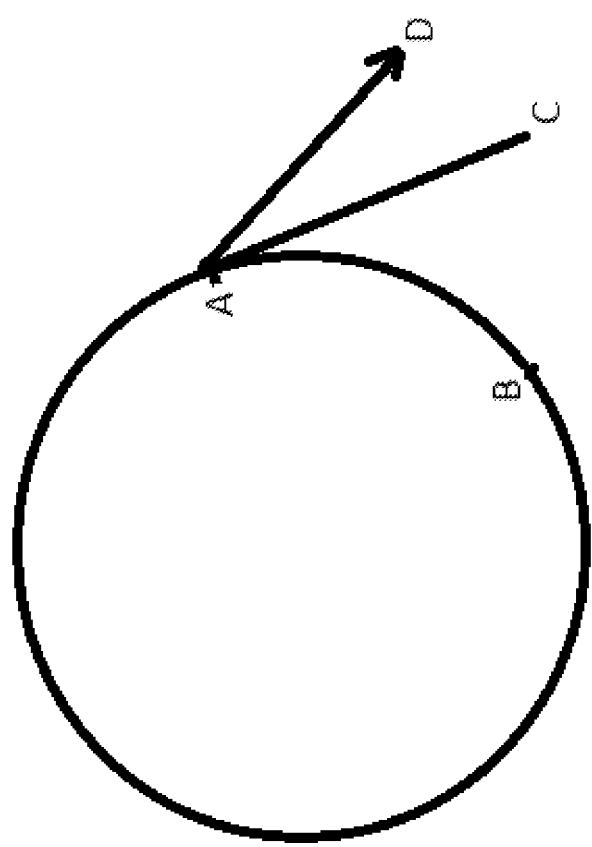
FIG. 32 is a schematic diagram of a concept about 'tangent outside'.

On any wing ring flying saucer, the top view of wing rings (annular rotors, annular propellers or annular wind wheels) is shown in FIG. 26, and the side view is shown in FIG. 31. Arc-shaped wings have lift wings, and lift of warping wing panels points at the axis of the wing ring.

Embodiment 29

On any wing ring flying saucer, wingspan orientations of wing rings (annular rotors, annular propellers or annular wind wheels) point at fins parallel to the axis of the wing ring, and the lower-pressure side of the fins is aligned at the axis of the wing ring (the chord line is parallel to a circumferential tangent of the wing ring). Not less than 3 fins are arranged on one circumference of the same wing ring at least, and the distance between every two fins on the circumference is equal.

The lower-pressure side of the fin refers to one side with a lower air pressure in two sides of the fin during air cutting by the fin.

Embodiment 30

For any disk aircraft taking wing rings (a coleopter, an annular propeller or an annular wind turbine) as a lift device, one end with smaller wing chords on all the fins of the wing ring face the axis direction (as shown in FIG. 24 or FIG. 26).

We claim:

1. A flight method of a flying saucer, for producing a driving force in a horizontal direction for a disk aircraft or a disk submarine taking a coleopter as a lift device, wherein a plurality of airfoils or flow generators are arranged on a wing ring and at least one of the plurality of airfoils or flow generators is operative to perform a same inclining process while passing by a specific section of the wing ring in circular motions of two or more times in succession, wherein the inclining process of each of the at least one airfoil comprises an inclining process of a wingspan orientation of the airfoil or an inclining process of an angle of attack of the airfoil, the inclining process of each of the at least one flow generator comprises an inclining process of a fluid jet direction of the flow generator;

wherein in the inclining process of the angle of attack of the at least one airfoil in successive two times of "while passing by a specific section in circular motions of two times or more than three times in succession", the at least one airfoil only "repeat the same inclining process of the angle of attack" in the current respective whole processes, while the successive two times of the whole inclining processes are not the same inclining process and even are completely opposite inclining processes.

2. The flight method according to claim 1, wherein more than one specific section is set on the wing ring.

3. The flight method according to claim 2, wherein two specific sections of the wing ring are set as a section group in midpoint symmetry.

4. The flight method according to claim 1, wherein in the two times of 'while passing by a specific section in circular motions of two times or more than three times in succession', the airfoils only 'repeat the same inclining process of the wingspan orientation' in the respective whole processes, while t successive two times of the whole inclining processes are not the same inclining process and even are completely opposite inclining processes; or the fluid generators only 'repeat the same inclining process' in the respective whole processes, while the two times of the whole processes are not the same inclining process, and even are completely opposite inclining processes.

5. The flight method according to claim 1, wherein the quantity of the section groups of the wing ring is more than 1.

6. The flight method according to claim 1, wherein airfoils on the same wing ring have opposite wingspan orientations in the two specific sections of the wing ring.

7. A dynamic inclination coleopter, belonging to annular rotorcrafts, annular propeller machines or annular wind turbines, wherein at least 2 airfoils or flow generators are arranged on a same circumference of a wing ring and are at least one airfoil or flow generator is equipped with an inclination mechanism; each inclination mechanism is operative to incline when passing by a specific section of the wing ring and operative to restore to a state before inclination after passing by the specific section, and the inclination mechanism is a mechanism operative to change wingspan orientations or angles of attack of the airfoils, or a mechanism operative to change a direction of an acting force produced by fluid generators;

wherein the at least one airfoil or flow generator equipped with the inclination mechanism is operative to perform a same inclining process while passing by the specific section of the wing ring in circular motions of two or more times in succession, wherein the inclining process of each of the at least one airfoil comprises an inclining process of the wingspan orientation of the airfoil or an inclining process of an angle of attack of the airfoil, the inclining process of each of the at least one flow generator comprises an inclining process of a fluid jet direction of the flow generator;

wherein in the inclining process of the angle of attack of the at least one airfoil in successive two times of "while passing by a specific section in circular motions of two times or more than three times in succession", the at least one airfoil only "repeat the same inclining process of the angle of attack" in the current respective whole processes, while the successive two times of the whole inclining processes are not the same inclining process and even are completely opposite inclining processes.

8. The dynamic inclination coleopter according to claim 7, wherein the number of wing rings is not less than two, and at least two wing rings have the same center of a circle but different radiuses.

9. The coleopter according to claim 7, wherein the number of the wing rings is not less than two; a radial channel engine room is arranged; and the radial channel engine room is independently disposed, or forms a combined engine room with an annular engine room or/and a central radial channel engine room.

10. The dynamic inclining coleopter according to claim 7, wherein not less than three airfoils or flow generators are arranged on the same circumference and are arranged in a ring array; and the airfoils or flow generators are operative to produce an acting force pointing to an axis of the wing ring.

\* \* \* \* \*